United States Patent
Powers et al.

(10) Patent No.: US 11,172,126 B2
(45) Date of Patent: Nov. 9, 2021

(54) METHODS FOR REDUCING POWER CONSUMPTION OF A 3D IMAGE CAPTURE SYSTEM

(71) Applicant: Occipital, Inc., Boulder, CO (US)

(72) Inventors: Jeffrey Powers, San Francisco, CA (US); Patrick O'Keefe, San Francisco, CA (US)

(73) Assignee: Occipital, Inc., Boulder, CO (US)

( * ) Notice: Subject to any disclaimer, the term of this patent is extended or adjusted under 35 U.S.C. 154(b) by 865 days.

(21) Appl. No.: 14/216,010

(22) Filed: Mar. 17, 2014

(65) Prior Publication Data

US 2014/0267631 A1   Sep. 18, 2014

Related U.S. Application Data

(60) Provisional application No. 61/792,728, filed on Mar. 15, 2013.

(51) Int. Cl.
| | | |
|---|---|---|
| H04N 5/33 | (2006.01) | |
| H04N 13/25 | (2018.01) | |
| H04N 5/232 | (2006.01) | |
| H04N 13/296 | (2018.01) | |

(52) U.S. Cl.
CPC ... *H04N 5/232411* (2018.08); *H04N 5/23229* (2013.01); *H04N 5/33* (2013.01); *H04N 13/25* (2018.05); *H04N 13/296* (2018.05)

(58) Field of Classification Search
None
See application file for complete search history.

(56) References Cited

U.S. PATENT DOCUMENTS

| | | |
|---|---|---|
| 6,303,209 B1 | 10/2001 | Kobayashi |
| 2008/0268900 A1 | 10/2008 | Lee |
| 2009/0184849 A1 * | 7/2009 | Nasiri ............... G06F 3/0346 341/20 |
| 2010/0160006 A1 | 6/2010 | Wu |
| 2012/0257008 A1 | 10/2012 | Taylor |
| 2012/0287035 A1 | 11/2012 | Valko et al. |
| 2013/0322708 A1 | 12/2013 | Heringslack |
| 2013/0329064 A1 | 12/2013 | Price et al. |
| 2014/0037135 A1 | 2/2014 | Kutliroff et al. |
| 2014/0066123 A1 | 3/2014 | Huang et al. |
| 2014/0139639 A1 * | 5/2014 | Wagner ............ H04N 13/0253 348/46 |
| 2014/0354868 A1 | 12/2014 | Desmarais et al. |
| 2014/0368639 A1 | 12/2014 | Wu et al. |
| 2015/0029294 A1 | 1/2015 | Lin et al. |
| 2015/0050922 A1 | 2/2015 | Ramalingam et al. |
| 2015/0126244 A1 | 5/2015 | Moran et al. |

FOREIGN PATENT DOCUMENTS

WO   2012091807 A   7/2012

* cited by examiner

*Primary Examiner* — Mikhail Itskovich

(74) *Attorney, Agent, or Firm* — Lee & Hayes, P.C.

(57) ABSTRACT

A method for reducing power consumption of a 3D image capture system includes capturing 3D image data with the 3D image capture system while the 3D image capture system is in a first power state, detecting a power state change trigger, and switching from the first power state to a second power state based on the power state change trigger, wherein the 3D image capture system consumes less power in the second power state than in the first power state.

20 Claims, 3 Drawing Sheets

METHODS FOR REDUCING POWER CONSUMPTION OF A 3D IMAGE CAPTURE SYSTEM

CROSS-REFERENCE TO RELATED APPLICATIONS

This application claims the benefit of U.S. Provisional Application Ser. No. 61/792,728, filed on 15 Mar. 2013, which is incorporated in its entirety by this reference.

TECHNICAL FIELD

This invention relates generally to the 3D imaging field, and more specifically to new and useful methods for reducing power consumption of a 3D image capture system.

BACKGROUND

The field of 3D imaging is a rapidly growing area of interest with numerous applications, including applications in construction, manufacturing, research, entertainment, and medicine. A number of these applications require 3D image capture that can perform imaging in real-time and in-situ. Current 3D image capture solutions that meet these criteria are often too power-hungry to perform effectively. Providing a novel solution to reduce power consumption for 3D image capture systems is not only useful for current applications but is also potentially capable of opening up new fields of application as well. Thus, there is a need in the field of 3D imaging to create new and useful methods for reducing power consumption of a 3D image capture system. This invention provides such new and useful methods.

DESCRIPTION OF THE PREFERRED EMBODIMENTS

Figure 1:
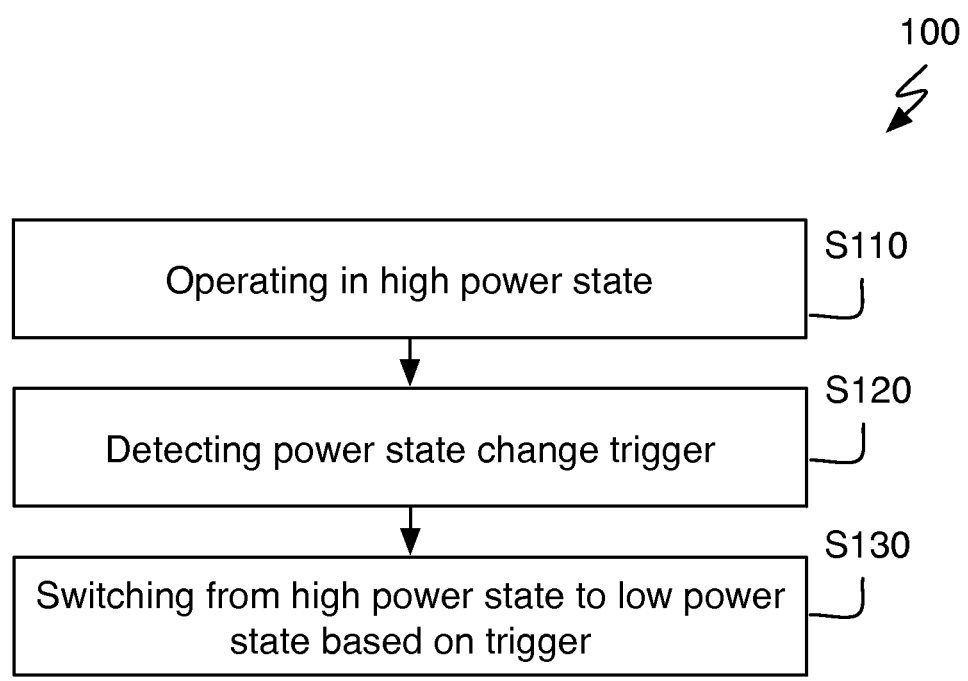
FIG. 1 is a flowchart representation of a method of a preferred embodiment.

The following description of the preferred embodiments of the invention is not intended to limit the invention to these preferred embodiments, but rather to enable any person skilled in the art to make and use this invention.

In a system of a preferred embodiment, 3D image capture systems use one or more of a variety of techniques to capture 3D image data. Some common techniques used for capturing 3D image data include time of flight capture, structured light capture, stereoscopic capture, photometric capture, and modulated light capture. All of these techniques consume power; for example, image sensor power, processing power, and in the case of active sensing techniques, emitter power. For many of these techniques (or combinations thereof), there exists a correlation between the performance of the 3D image capture system and the power consumption of the system; that is, a given 3D image capture system is often able to provide higher quality 3D image data if designed and/or operated with a higher power budget. At the same time, keeping power consumption low can be important for enabling 3D image capture systems to be used for mobile applications. The system can be implemented on a mobile computing device, a dedicated 3D image capture device, a 3D image capture system composed of multiple components (e.g., 3D imaging system coupled to a controlling computing device), and/or any suitable 3D imaging system.

A 3D image capture system preferably allows the capture of 3D image data through one or a combination of time of flight capture, structured light capture, and stereoscopic capture. The 3D image capture system may additionally or alternatively allow 3D image capture through photometric capture, modulated capture, or any other method of 3D image capture. The 3D image capture system preferably includes at least one RGB camera or a connection for an RGB camera to collect visible light visual information about the features being imaged, but may alternatively not include an RGB camera or a connection for an RGB camera. The 3D image capture system preferably includes a processor for processing 3D image data from raw sensor input, but may additionally or alternatively transmit raw sensor input to be processed elsewhere. The 3D image capture system preferably is powered by a battery, but may additionally or alternatively be powered by any suitable means. The 3D capture system preferably includes a motion-detecting sensor (e.g. an accelerometer, a gyroscope, or an inertial measurement unit (IMU)) but may alternatively not include a motion-detecting sensor.

The 3D image capture system is preferably capable of tracking the motion of the 3D image capture system through a three-dimensional space (e.g. egomotion) or relative to a reference in a three-dimensional space. The 3D image capture system is likewise preferably capable of tracking the pose of the 3D image capture system relative to an initial pose. The 3D image capture system may track the motion of the 3D image capture system using 3D image-based motion tracking techniques, 2D image-based motion tracking techniques, motion sensor data-based motion tracking techniques, and/or any other suitable motion tracking techniques. Some example 3D image-based motion tracking techniques include iterative closest point (ICP), perspective-n-point (PnP), and direct methods using dense image warping. Some example 2D image-based motion tracking techniques include utilizing the N-point algorithms that recover the essential or fundamental matrix, solving the structure from motion problem, or solving a nonlinear cost function for the motion by considering the reprojection error between two frames.

Combinations of these tracking techniques can be used to achieve some of the benefits of 3D image-based motion tracking techniques without requiring a continuous stream of 3D image data (and thus potentially not requiring 3D sensing elements to be active, reducing power). For example, a PnP algorithm can continue to be used on 2D image data given the 3D locations of visual features that were acquired the last time 3D image data was taken. In the minimal case for PnP, tracking can continue with a single passive camera as long as three visual features are still visible. As another example, using a 5-point visual odometry algorithm, motion can be tracked by propagating scale originally acquired from captured 3D image data.

As a third example, the 3D image capture system may use pose data from an IMU sensor as an initial estimate of the current pose of the 3D image capture system. 2D image data from an RGB camera of the 3D image capture system can be warped relative to a reference frame of 3D image data. Methods to generate reference frames may include keyframing, where one or several previous 3D image data can be reused as long as they overlap with the current 2D image data. Methods to generate reference frames may also include 3D projection of the current map representation, such as mesh rendering, ray casting from voxel presentation and surfels projection, or any other suitable reference frame generation method. The 3D image capture system then refines the pose estimate by minimizing the error between the reference frame and warped 2D image data.

A related technique utilizes sparse features (e.g., SIFT, SURF, ORB) identified from the 2D image data instead of directly utilizing the 2D image data. Sparse features are also generated for the reference frame, and may be warped to the initial estimate of the current pose, or directly matched to the features identified from the 2D image data using visual descriptors. The 3D image capture system then refines the pose estimate by minimizing the error between the warped reference frame sparse features and the sparse features identified from the 2D image data. Other related techniques may utilize RGB residuals, for example by identifying sparse features only in the reference frame and minimizing the RGB difference between the warped reference frame sparse features and their corresponding location in the 2D image data.

Other examples of continuing motion tracking with a single passive camera involve using standard computer vision techniques for estimating motion from a single camera. With a single camera, these methods share the disadvantage that metric scale is unknown. However, with the use of 3D image data mentioned above, metric scale is known. In some cases, data from an IMU or other motion sensor could be additionally or alternatively used to determine metric scale. When 3D image data is no longer being captured, the algorithms can propagate the metric scale through several iterations or frames, continuing the motion tracking process. 3D image data may be periodically or selectively be captured to ensure metric scale is properly being maintained.

3D image data captured by the 3D image capture system preferably includes 3D images (or 2D image data with associated third-dimension data) along with the pose of the 3D image capture system at the time the images were taken. 3D image data may additionally or alternatively include sets of 2D images along with pose data comprising at least two distinct poses (from which associated third-dimension data may be derived), or any other suitable 3D image data. Including the pose of the 3D image capture system in the 3D image data allows the 3D image capture system to capture 3D image data at more than one perspective, allowing, for instance, the complete imaging of a 3D space or object.

Including the pose of the 3D image capture system in the 3D image data also allows for 3D image data to be derived from the combination of captured 2D image data, the pose (or motion) of the 3D image capture system, and reference 3D image data; henceforth referred to as a derived data technique. For example, the 3D image capture system captures a first frame of 3D image data (including a 3D image and the position and orientation data of the 3D image capture sensor) at some time $t_0$. The 3D image capture system then tracks egomotion from time $t_0$ to time $t_1$. At time $t_1$, the 3D image capture system captures a frame of 2D image data. Using the first frame of 3D image data taken at time $t_0$, the tracked egomotion, and the frame of 2D image data taken at time $t_1$, the 3D image capture system can derive 3D image data at time $t_1$. The capability to derive 3D image data from 2D image data and 3D image capture system motion data allows for 3D image data to be captured at times and/or positions where depth information has not been captured. Since capturing depth information is often power-intensive, this capability can allow for 3D image capture systems to save power by operating depth cameras or other power-intensive sensors at only a subset of times and/or positions that 3D image data is desired.

Derived data techniques can operate on any suitable source of reference 3D image data (including artificially generated 3D models), any suitable source of 3D image capture system motion or pose data, and any source of suitable 2D image data. Derived data techniques may derive 3D image data from these inputs using any suitable algorithm or combination of algorithms. Derived data techniques may be used by the 3D image capture system in real-time, but they may also be used on captured image data at any other time. For example, the 3D image capture system may capture a series of 2D images along with pose data for each image. The combined image and pose data may then be processed at a later date (either by the 3D image capture system or any other suitable computing device) into 3D images by stitching the 2D images together based on the pose data. In this example, the reference 3D image data is derived from the pose data and the 2D image data.

The 3D image capture system is preferably capable of capturing 3D image data in more than one way; for example, the 3D image capture system may include an active depth camera and an RGB camera. The 3D image capture system could then capture 3D image data by using a combination of depth data from the active depth camera and 2D image data captured by the RGB camera, or by using a derived data technique operating on 2D image data from the RGB camera, reference 3D image data (either previously captured by the depth camera and RGB camera or otherwise generated), and pose/motion data from any suitable source. Capturing 3D image data using the active depth camera would probably be more robust but also require more power than the derived data technique, so the 3D image capture system could intelligently save power by only using the active depth camera when necessary. In this example, the active depth camera could be a structured light-based depth camera (potentially including a structured light projector and an infrared camera), a time-of-flight-based depth camera (potentially including a modulated illumination unit and an infrared camera), or any other suitable type of active depth camera. The 3D image capture system may additionally include a motion sensor (e.g. an IMU), which may be used for determining pose/motion data.

A similar example 3D image capture system substitutes a second RGB camera for the active depth camera. The 3D image capture system could then capture 3D image data from a combination of 2D image data captured by each RGB camera (e.g. by using a stereoscopic technique), or by using a derived data technique operating on 2D image data from the RGB cameras, reference 3D image data (either previously captured using a stereoscopic technique or otherwise generated), and pose/motion data from any suitable source. Capturing 3D image data using both cameras would probably be more robust but also require more power than the derived data technique, so the 3D image capture system could intelligently save power by only using both cameras when necessary.

Another similar example 3D image capture system adds an assistive projector to the two RGB cameras to assist in 3D image capture, particularly in featureless areas of the scene. Capturing 3D image data using the projector and the second camera would probably be more robust but also require more power than the derived data technique, so the 3D image capture system could intelligently save power by only using the projector and the second RGB camera when necessary.

Method for Reducing Power Consumption of a 3D Image Capture System

As shown in FIG. 1, a method 100 for reducing power consumption of a 3D image capture system includes operating the 3D image capture system in a high power state S110, detecting a power state change trigger S120, and switching from the high power state to a low power state based on the power state change trigger S130.

The method 100 preferably functions to enable the 3D image capture system to capture high quality 3D image data while maintaining low overall power consumption through the use of intelligent power state switching. Intelligent power state switching preferably enables the 3D image capture system to operate in one of multiple power states depending on the needs of a particular situation. For example, if the 3D image capture system operates using an active depth camera, the 3D image capture system may be operated in a power state using a reduced (i.e. below maximum) emitter power while imaging features within a certain range; this would serve to reduce power usage without substantially reducing the quality of captured 3D image data. As a second example, if the 3D image capture system has several emitters optimized for different conditions (e.g. different imaging ranges), the 3D image capture system maybe operated using only the subset of emitters optimized for image features within a certain range.

Each power state has associated instructions for how the 3D image capture system should operate. Power states preferably include configuration data for configurable settings of the 3D image capture system that have an effect on the power consumption of the 3D image capture system. Power states may include instructions on how a 3D image capture system should capture raw sensor data (e.g. the method of sensor data capture, the type of sensor used, configuration of the sensors used). In the case of active sensing, power states may include information on the type of emission used, configuration of the emitters, etc. If the 3D image capture system includes a grid emitter or other emitter capable of spatially directing illumination, the power state may include information on how that illumination should be spatially directed. For example, a grid emitter may focus on a certain region of interest by directing all illuminator power to the section of the grid emitter illuminating that region of interest.

Power states may also include information on how captured sensor data is processed into 3D image capture data or pose data; for example, the types of algorithms used for processing, the types of captured sensor data to be processed, and settings for the processing hardware used to process the captured sensor data.

If the 3D image capture system includes an active depth camera, each power state preferably includes configuration data to determine what components of the active depth camera should be active at a given time. For example, the power states of a 3D image capture system having an active depth camera based on an infrared structured light technique may include configuration data on when the structured light projector and the infrared camera should be powered (this may include pulsing the projector and infrared camera according to a pattern that may be either pre-defined or set in response to captured sensor data), the output power of the projector, and whether the RGB camera should be powered. Likewise, the power states of a 3D image capture system having two RGB cameras may include configuration data on which of the RGB cameras should be powered at any given time and instructions for what captured sensor data should be processed and how it should be processed. For example, this might entail using a two-camera based stereoscopic technique in one power state and a derived data technique in another power state.

Power states preferably also include instructions for what captured sensor data should be processed and how it should be processed; for example, this might entail using a structured light/time of flight technique in one power state but only using a derived data technique in another power state. Determining how captured sensor data should be processed may include reducing power to the image processor or turning off the image processor; for example, if the image processor is designed primarily to efficiently process 3D image capture data from a structured light technique, that image processor might be turned off (and another processor used instead) when the 3D image capture system is capturing 3D image data using a derived data technique.

Step S110 includes operating the 3D image capture system in a high power state. The high power state is preferably a power state used by the 3D image capture system when the 3D image capture system is first initialized or when the 3D image capture system has not yet received a power state change trigger, but may additionally or alternatively be any power state with a higher power consumption than the low power state of S130. The high power state can be a default 3D image capture mode or optionally a high quality 3D image capture mode. In a 3D image capture system having an active depth camera, the high power state preferably directs the 3D image capture system to use the active depth camera; in a 3D image capture system having two RGB cameras, the high power state preferably directs the 3D image capture system to use a two-camera stereoscopic capture technique. The image capture technique of the 3D image capture system operating in the high power state is preferably the primary image capture technique. The primary image capture technique may be a single technique (e.g. structured light) or may be a combination of multiple techniques (e.g. structured light techniques used in combination with derived data techniques and/or stereoscopic techniques). The high power state preferably also includes instructions for the capture of pose data; the pose capture technique of the 3D image capture system operating in the high power state is preferably the primary pose capture technique. The primary pose capture technique preferably directs the 3D image capture system to use one or more 3D-image based motion tracking techniques, potentially in combination with other tracking techniques. If the 3D image capture system includes a motion sensor, the primary pose capture technique preferably integrates one or more techniques based on motion sensor data.

Figure 2:
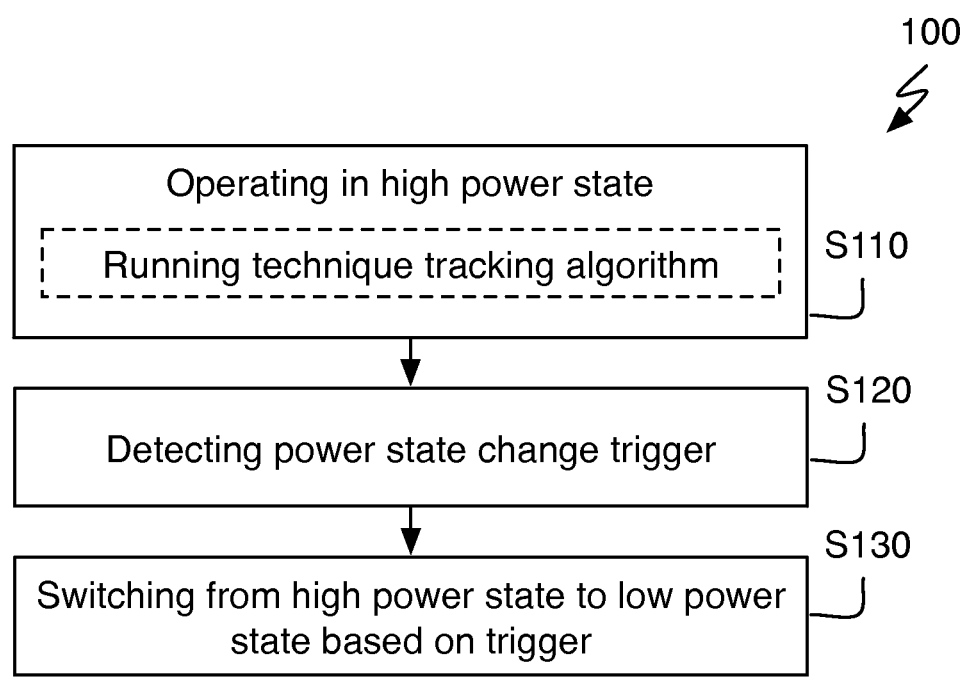
FIG. 2 is a flowchart representation of a variation of a method of a preferred embodiment.

As shown in FIG. 2, operating the 3D image capture system in a high power state S110 may additionally include running a technique tracking algorithm. The technique tracking algorithm functions to evaluate the potential success of one or more secondary image capture techniques and/or one or more secondary pose capture techniques in capturing 3D image data. Based on that potential success, the technique tracking algorithm may signal to the 3D image capture system (through the generation of a power state change trigger) that it may be possible to switch to secondary capture techniques from primary capture techniques without substantially reducing the quality of captured 3D image data, allowing for power savings.

The technique tracking algorithm preferably evaluates success by capturing 3D image data using one or more secondary techniques and analyzing the results of the secondary techniques. For example, while the 3D image capture system is capturing 3D image data using a structured light technique, the technique tracking algorithm may direct the 3D image capture system to simultaneously capture some 3D image data using a derived data technique, and to analyze the results of the 3D image data capture via the derived data technique. As a second example, while the 3D image capture system is capturing 3D image data using a structured light technique where the emitter is always on, the technique tracking algorithm may direct the 3D image capture system to briefly switch to a structured light technique where the emitter is pulsed, and then analyze the results of the 3D image data capture via the pulsed-emitter structured light technique. As a third example, while the 3D image capture system is capturing 3D image data using a structured light or time-of-flight technique with the emitter operating at a high power, the technique tracking algorithm may direct the 3D image capture to reduce the emitter power, and analyze the results with the lower emitter power.

Analyzing the results of the secondary techniques preferably includes comparing the data captured by the primary techniques to the data captured by the secondary techniques and/or analyzing the data captured by the secondary techniques relative to a quality threshold, but may additionally or alternatively include analyzing the results of the secondary techniques in any suitable manner. For example, for a 2D-image based pose tracking technique, the Hessian matrix of RGB intensity with respect to the pose derivative might be computed. If the condition number of the Hessian matrix is smaller than a particular threshold, the 2D image-based pose tracking technique is able to constrain pose refinement (i.e., the technique satisfies the quality threshold of being able to constrain pose refinement). Another example for a 2D-image based pose tracking technique is to use some statistics on the residuals (e.g. mean, variance) to derive a quality measure. Examples of methods to determine the quality of sparse 2D-image based secondary techniques include analyzing the number of sparse features detected, their spatial distribution, and/or the number of sparse features matches. In addition to the quality measures that can be estimated from 2D image data, an additional source of motion estimation, such as an IMU, may be used to estimate the quality by measuring the difference between the image-based motion estimate and the additional source motion estimate.

The technique tracking algorithm may additionally or alternatively predict potential success of secondary techniques by analyzing data captured by the primary techniques or by running a surrogate function (e.g., a function meant to predict potential success without actually running the secondary technique). For example, the technique tracking algorithm may be run on 3D image data captured by the primary technique to determine if the scene being captured is well-suited for the use of a secondary tracking technique. As another example, a derived data technique with low accuracy and low computational requirements is run as a surrogate function to predict the success of a derived data technique with higher accuracy and higher computational requirements.

The technique tracking algorithm is preferably run in the high power state, but may additionally or alternatively be run in any other power state. The technique tracking algorithm is preferably run in parallel with the primary capture techniques, but may additionally or alternatively be run at any suitable time. In some cases, the technique tracking algorithm may require performing operations that are in some way incompatible with the currently operating tracking techniques; in these situations, the technique tracking algorithm preferably switches operating procedures from those required for the currently operating tracking techniques to those required for the technique tracking algorithm for a brief period of time before switching back to the operating procedures required for the currently operating tracking techniques. This procedure is exemplified by the previously mentioned example of the emitter being briefly switched from an always-on mode to a pulsed mode by the technique tracking algorithm.

The technique tracking algorithm may be run according to a particular schedule (e.g. for ten seconds every ten minutes or for whenever the primary capture techniques are active), may be run conditionally in response to an event (e.g. if the results of the primary techniques drop below some quality level), or may be run in any other suitable manner.

Step S120 includes detecting a power state change trigger. Power state change triggers are preferably events or occurrences that are used by the 3D image capture systems as signals to switch from one power state to another power state. Power state change triggers are preferably linked to a specific power state, but may additionally or alternatively be linked to a subset of parameters of a power state or to any other information that would provide instructions regarding a power state change of the 3D image capture system. For example, a power state change trigger generated by the technique tracking algorithm may direct the 3D image capture system to change to a power state utilizing a secondary technique tested by the technique tracking algorithm. As a second example, if emitter brightness is detected to be too low to illuminate a scene, this may be a trigger for the emitter power of the current power state to be increased (i.e. instructing the 3D image capture system to switch from the current power state to one that is substantially similar except for a higher emitter power).

Figure 3:
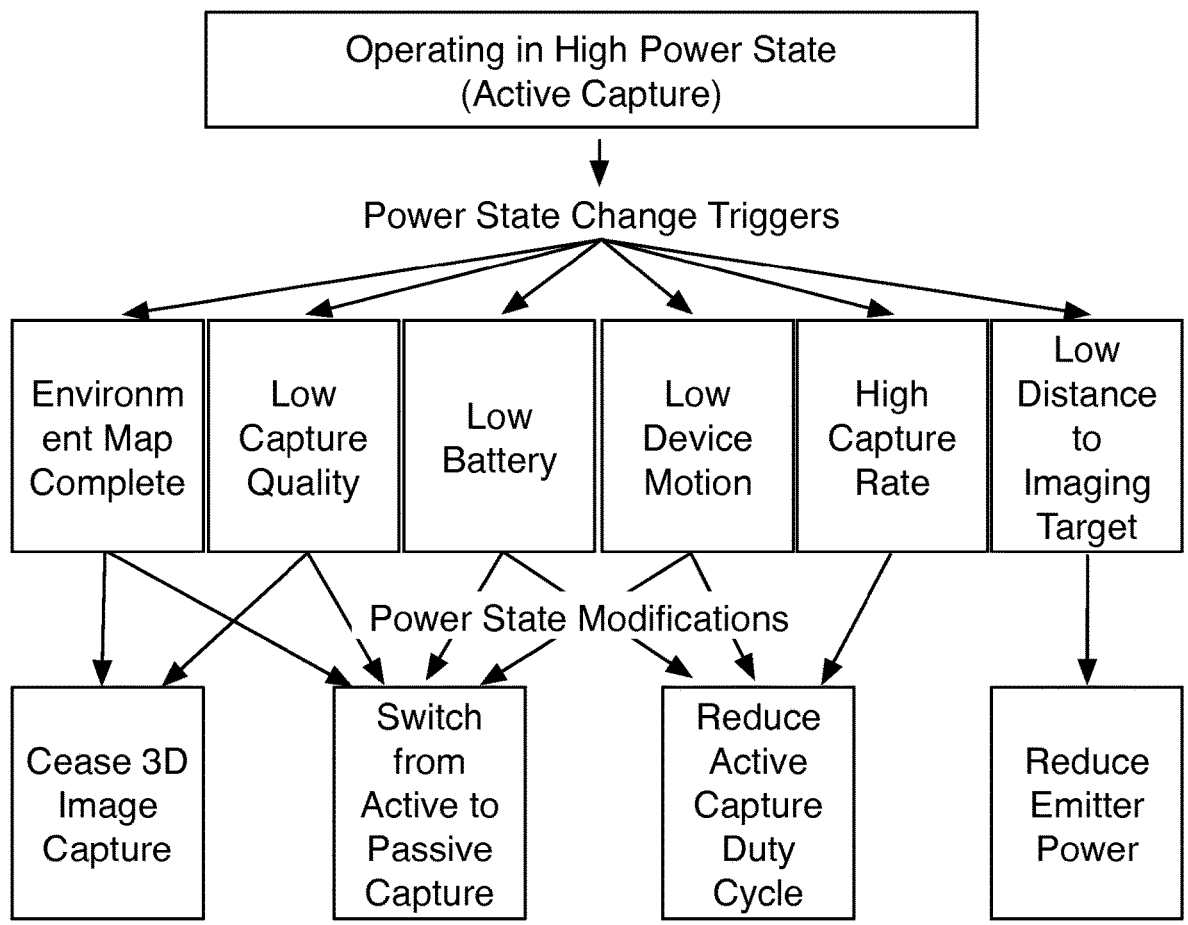
FIG. 3 is a chart representation of example power state change triggers and power state modifications of a method of a preferred embodiment.

Power state triggers may be explicitly generated in response to an event (as with the technique tracking algorithm) or they may result directly from some detected event (e.g. egomotion falling below 1 cm/s, battery dropping below 10%, tracking quality being above some quality threshold for more than 30 seconds). As shown in FIG. 3, some power state triggers that may be used by the 3D image capture system (in addition to those generated by the technique tracking algorithm) include detecting a captured data quality change, detecting a map completeness change, detecting a battery charge change, detecting a device motion change, detecting an imaging target distance change, and detecting a user activity change. These power state triggers preferably result from changes occurring during operation of the 3D image capture system, but may additionally or alternatively result from changes relative to a default or historical value. For example, if the 3D image capture system has just started imaging, it may set emitter power based on a historical or default imaging target distance. Detecting that the imaging target distance is substantially smaller than the historical or default imaging target distance may result in a power state trigger.

Detecting a captured data quality change preferably includes detecting that the quality of captured data (e.g., 3D image data, 2D image data, pose data, sensor data) has crossed a threshold, that the rate of change of quality of captured data has crossed a threshold, and/or that any other metric relating to the quality of captured data has caused a result correlated to a power state change trigger. Quality of captured data may be measured by any suitable metric. For example, if sensor data from a depth camera is detected to be unreliable (e.g., where the imaging target is outside of the known reliable operating range of the depth camera, or when some percentage of depth holes exceeds a pre-defined threshold, when the depth camera registers too much infrared reflectance, or when the confidence measure of the depth camera is too low), this detection may serve as a measure of reduced captured data quality, and thus may result in a power state change trigger directing the 3D image capture system to switch to a power state where the depth camera is turned off and a different capture technique is used.

Detecting a map completeness change preferably includes detecting that the completeness of an environmental map has crossed a threshold, that the rate of change of quality of completeness has crossed a threshold, and/or that any other metric relating to map completeness has caused a result correlated to a power state change trigger. For example, the 3D image capture system may have awareness that an environment has already been imaged at some set of poses. Detecting that the 3D image capture system is in a pose of this set of previously imaged poses (or that the set of poses is sufficient to complete a map of an environment or an object) may result in a power state change trigger directing the 3D image capture system to switch to a power state where 3D image capture is ceased (since this part of the environment has already been imaged). Likewise, if the 3D image capture system is in a power state where 3D image capture is ceased due to a map completeness change, and the 3D image capture system moves to a pose that has not been previously imaged, this may result in a power state change trigger directing the 3D image capture system to switch back to a power state where 3D image data is being captured. As another example, the 3D image capture sensor may detect that while a particular pose hasn't been captured, surrounding poses within some threshold distance have been captured; this power state change trigger may result in switching from a power state where the 3D image capture system uses a primary capture technique to a power state where the 3D image capture system uses a secondary capture technique (because data from the surrounding poses already captured may be used to increase robustness of the secondary technique).

In one example, the current power state of the 3D image capture system includes a 3D image data capture technique utilizing volumetric integration, such as using a voxel grid and a truncated signed distance function (TSDF). For each new observation of 3D image data, the volume's contents are updated to reflect this new information. After mapping for a period of time, it can be detected if the new updates to the volumetric structure are still meaningful. A trivial update could be classified as one where the new information changes the values contained in the volume within the limits of the noise of the sensor. Detecting a certain number of these trivial updates results in a power state change trigger from the current power state to a power state where the depth camera and associated processing hardware is turned off. This power state change results in a decrease in power consumption without a decrease in map quality. The map that has been captured up to this point might be part of a power state change trigger that would direct the 3D image capture system to switch back to a power state where the depth camera is actively utilized.

Detecting a battery charge change preferably includes detecting that a battery charge level of the 3D image capture system has crossed a threshold, that the rate of change of battery charge level has crossed a threshold, and/or that any other metric relating to the battery charge level has caused a result correlated to a power state change trigger. For example, the battery charge level falling below 10% might result in a power state change trigger directing the 3D image capture system to switch from a power state where the 3D image capture system uses a primary capture technique to a power state where the 3D image capture system uses a secondary capture technique of lower power consumption. Likewise, the battery charge level increasing above 10% might result in a power state change trigger directing the 3D image capture system to perform the opposite power state change.

Detecting a device motion change preferably includes detecting that the motion of the 3D image capture system has crossed a threshold, that the rate of change of motion of the 3D image capture system has crossed a threshold, and/or that any other metric relating to the motion of the 3D image capture system has caused a result correlated to a power state change trigger. For example, detecting that the motion of the 3D image capture system has passed below some low motion threshold may result in a power state change trigger directing the 3D image capture system to switch from a power state in which a depth camera is on and sampling continuously to a power state in which a depth camera is pulsed. Pulsing may occur according to any frequency or pattern. Likewise, detecting that the motion of the 3D image capture system has increased above some low motion threshold may result in the opposite power state change.

Detecting an imaging target distance change preferably includes detecting that the distance between the 3D image capture system and an imaging target has crossed a threshold, that the rate of change of the distance between the 3D image capture system and an imaging target, and/or that any other metric relating to the distance between the 3D image capture system and an imaging target has caused a result correlated to a power state change trigger. For example, the 3D image capture system may have a calculated table of required emitter intensities at various imaging target distance ranges for achieving acceptable 3D image quality for a given application. Detecting that the imaging target distance has moved from one range to another range may result in a power state change trigger that directs the 3D image capture system to switch to a power state corresponding to the emitter power for that that imaging target distance range. This power state may additionally include information linked to the emitter power (such as an appropriate gain setting for the camera detecting the light output of the emitter).

Detecting a user activity change preferably includes detecting a change in how the user is interacting with the 3D image capture system, and/or that any other metric relating user activity has caused a result correlated to a power state change trigger. For example, a user may set the 3D image capture system on a desk and leave it there. The 3D image capture system may (potentially through IMU measurements) detect that the 3D image capture system is no longer actively being moved, resulting in a power state change trigger that directs the 3D image capture system to switch from a power state where it is capturing 3D image data to a power state where the 3D image capture system is not capturing 3D image data. Likewise, when the 3D image capture system is picked up from the desk, this might result in another power state change trigger.

Other device power state change triggers include detecting that the rate of 3D image data captured by the 3D image capture system crosses a threshold rate. The threshold rate may be set in any suitable manner. For example, the 3D image capture system might calculate an initial processing framerate according to the maximum number of frames per second that the processing resources are able to handle in real-time, or are able to store in accordance with storage limits. Next, given the motion of the 3D image capture system (or objects it is observing), the 3D image capture system might estimate future motion for the next several frames by assuming this motion will continue for the next several frames (or by using a predictive method like Kalman filtering). Given this motion prediction, and the previously captured data, the 3D image capture system might estimate the amount of new (non-redundant) information that will be gained per unit of time. For example, assuming a rectangular plane is being observed that is perpendicular to 3D image capture system which is located at the mean distance of the observed scene, the 3D image capture system can calculate the number of previously unobserved pixels that will be uncovered at different points in time using straightforward geometry. Using a sensor coverage threshold (e.g., the period of time it takes for the number of previously unobserved pixels to reach 10% of the number of total pixels of the sensor being used), the 3D image capture system can calculate a coverage framerate. The 3D image capture system then might set the lower of the processing framerate and the coverage framerate as the threshold framerate.

When the rate of 3D image data capture increases above the threshold framerate, this results in a power state change trigger that directs the 3D image capture system to switch to a power state in which the emitter of the 3D image capture system pulses on and off at the threshold framerate. More specifically, the emitter can be synchronized with its corresponding camera such that the emitter is on during the period of time where the camera is accumulating photons in its pixels, but so that it is not on for longer than necessary to do so. The corresponding camera can also be slowed to a lower framerate not by slowing its accumulation time, but by pausing between successive frames.

Step S130 includes switching from the high power state to a low power state based on the power state change trigger. Switching from a high power state to a low power state allows the 3D image capture system to reduce power consumption, and thus increase duration of use on a single battery charge. Step S130 may additionally or alternatively include switching from any power state to any other power state based on the power state change trigger. Power state change triggers preferably have power state transitions associated with them, and the relations between power state change triggers and power state transitions are preferably stored on the 3D image capture system. When a power state change trigger occurs, the 3D image capture system preferably executes the power state transition associated with that power state change trigger. The 3D image capture system may additionally or alternatively change power states based on the power state change trigger in any other suitable way. For example, if the power state change trigger is generated by the 3D image capture system, the associated power state transition may also be generated and passed to the 3D image capture system along with the power state change, instead of being pre-defined and/or stored persistently on the 3D image capture system.

The methods of the preferred embodiment and variations thereof can be embodied and/or implemented at least in part as a machine configured to receive a computer-readable medium storing computer-readable instructions. The instructions are preferably executed by computer-executable components preferably integrated with the 3D image capture system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for reducing power consumption of a three-dimensional (3D) image capture system comprising:
    capturing, in a first power state, by a red-green-blue (RGB) camera two-dimensional (2D) image data, at least a portion of the image data representative of an object;
    capturing, in the first power state, by a depth camera depth data, at least a portion of the depth data representative of the object;
    generating first 3D image data, in the first power state, based on the 2D image data without the depth data;
    generating second 3D image data, in the first power state and substantially simultaneously with generating the first 3D image data, based at least in part on a combination of the 2D image data and the depth data;
    comparing the first 3D image data and the second 3D image data to determine that the first image tracking technique is successful;
    identifying, in the first power state, an imaging target based at least in part on the 2D image data and the depth data;
    determining, in the first power state, a distance between the object and the 3D image capture system;
    determining a threshold based at least in part on historical values between the image target and the 3D image capture system;
    determining that the distance between the image target and the 3D image capture system is below the threshold; and
    switching from the first power state to a second power state, in response to determining that the distance between the image target and the 3D image capture system is below the threshold and that the first image tracking technique is successful, the 3D image capture system consuming less power in the second power state than in the first power state.

2. The method of claim 1, wherein the depth camera operates at a first pulse pattern having a first duty cycle in the first power state and the depth camera operates at a second pulse pattern having a second duty cycle in the second power state.

3. The method of claim 1, further comprising: determining a pose of the 3D image capture system; and
    analyzing a combination of the pose of the 3D image capture system, the 2D image data, and reference 3D image data to generate the first 3D image data.

4. A method of reducing power consumption of a three-dimensional (3D) image capture system, the method comprising:
    while operating the 3D image capture system in a first, high power state:
        using a red-green-blue (RGB) camera of the 3D image capture system to capture RGB data;
        using an active depth camera of the 3D image capture system to capture 3D depth data;

processing the RGB data, via a first image capture technique, to generate first 3D image data;

processing, in parallel to the first image capture technique, the RGB data and the 3D depth data, via a second image capture technique, to generate second 3D image data, the second image capture technique different than the first image capture technique;

comparing the first 3D image data and the second 3D image data to determine that the first image tracking technique is successful;

switching, in response to determining that the first image tracking technique is successful, the 3D image capture system to a second, low power state; and in the second, low power state, disabling the active depth camera.

5. The method of claim 4, wherein the active depth camera is a structured light camera having a structured light emitter and an infrared camera.

6. The method of claim 4, wherein the first image capture technique comprises capturing image data by pulsing an emitter of the 3D image capture system or reducing power of the emitter to capture the image data.

7. The method of claim 4, further comprising an emitter that can spatially direct emission to an area of interest in the second, low power state.

8. The method of claim 4, further comprising in the second, low power state:

identifying sparse features of the RGB data;

identifying a 3D reference frame from the RGB data and the 3D depth data captured in the first, high power state;

identifying additional sparse features for the 3D reference frame;

warping the additional sparse features to an initial estimate of a current pose to produce warped sparse features; and refining the initial estimate of the current pose to generate a refined pose.

9. The method of claim 4, further comprising:

after switching from the first, high power state to the second, low power state:

tracking a motion speed of the 3D image capture system, comparing the motion speed of the 3D image capture system to a low-motion speed value, detecting that the motion speed of the 3D image capture system is above the low-motion speed value; and switching, on the 3D image capture system, from the second, low power state to the first, high power state based on the motion speed of the 3D image capture system being above the low-motion speed value.

10. The method of claim 4, further comprising applying a surrogate function to determine that that the first tracking techniques can be successfully implemented in the second, low power state without the 3D depth data.

11. The method of claim 4, further comprising determining the first tracking technique is successful includes determining that each voxel of the 3D map is in a steady state.

12. The method of claim 4, wherein the first image capture technique is a structured light technique and the second image capture technique is a derived data technique.

13. A method for reducing power consumption of a three-dimensional (3D) image capture system comprising:

capturing, by a sensor and a camera associated with the sensor, active depth data and image data;

analyzing, by a processing resource, the active depth data and the image data to generate a 3D map of an environment;

analyzing, by the processing resource, additional active depth data and additional image data to detect a number of updates to the 3D map;

determining, by the processing resource, that the number of updates is greater than a threshold number of updates and that individual updates of the number of updates change the 3D map by less than a threshold amount; and in response to determining that the number of updates is greater than the threshold number of updates, reducing power to the sensor.

14. The method of claim 13, further comprising:

capturing, by the camera, red-green-blue (RGB) image data;

determining an initial estimate of pose of the 3D image capture system;

applying an image warping technique to produce warped RGB data with respect to a reference frame of 3D image data; and analyzing a result of the warped RGB data and the reference frame to determine a refined estimate of the pose of the 3D image capture system.

15. The method of claim 13, further comprising reducing the power to the sensor by, in part, disabling the senor.

16. The method of claim 13, further comprising:

determining that the 3D map is being extended by determining that sensor motion exceeds a motion threshold, extending the 3D map includes observing, by the sensor, a previously unmapped environment; and in response to determining that the 3D map is being extended, increasing power to the sensor.

17. The method of claim 13, further comprising processing a volumetric integration mapping to generate the 3D map.

18. The method of claim 13, further comprising:

capturing, by a sensor and a camera associated with the sensor, active depth data and image data;

analyzing the active depth data and the image data to generate a 3D map of an environment;

analyzing additional active depth data and additional image data to detect a number of updates to the 3D map;

determining an initial processing framerate based at least in part on a number of frames per second processed by the processing resource;

estimating future motion for a next predetermined number of frames;

estimating an amount of new data capture by the sensor and the camera during the next predetermined number of frames;

determining a coverage framerate based at least in part on the amount of new data and a time period; and wherein reducing the power to the sensor is also in response to determining that the coverage framerate crosses a threshold rate.

19. The method of claim 13, wherein determining that individual updates of the number of updates change the 3D map by less than a threshold amount includes:

determining, utilizing a volumetric integration and truncated signed distance function, a number of individual trivial updates of the number of updates, each of the individual trivial updates changing values contained in the 3D map within a limit based on a noise of the sensor; and determining that the number of individual trivial updates exceeds a predetermined number of updates.

20. The method of claim 13, further comprising:
detecting a device motion change;
determining a rate of the device motion change; and
wherein reducing the power to the sensor is also in response to determining that the rate of the device motion change has crossed a motion threshold.

* * * * *